United States Patent

Schaefer et al.

[11] Patent Number: 5,119,448
[45] Date of Patent: Jun. 2, 1992

[54] MODULAR MICRO-OPTICAL SYSTEMS AND METHOD OF MAKING SUCH SYSTEMS

[75] Inventors: Stephen R. Schaefer, Carlsbad; James H. Bechtel, San Diego, both of Calif.

[73] Assignee: Tacan Corporation, Carlsbad, Calif.

[21] Appl. No.: 586,453

[22] Filed: Sep. 21, 1990

[51] Int. Cl.⁵ .................... G02B 5/14; G02B 5/172
[52] U.S. Cl. ...................................................... 385/4
[58] Field of Search ............... 350/96.10, 96.12, 96.15, 350/96.20, 320

[56] References Cited

U.S. PATENT DOCUMENTS

| | | | |
|---|---|---|---|
| 4,070,516 | 1/1978 | Kaiser | 428/137 |
| 4,079,404 | 3/1978 | Comerford et al. | 357/19 |
| 4,130,343 | 12/1978 | Miller et al. | 331/94.15 |
| 4,130,345 | 12/1978 | Doellner | 350/96.22 |
| 4,147,403 | 4/1979 | d'Auria et al. | 350/96.18 |
| 4,164,364 | 8/1979 | Witte | 350/96.17 |
| 4,241,109 | 12/1980 | Johnson | 427/162 |
| 4,285,571 | 8/1981 | Winzer | 350/96.18 |
| 4,286,838 | 9/1981 | Huignard et al. | 350/96.11 |
| 4,293,826 | 10/1981 | Scifres et al., | 331/94.5 H |
| 4,297,653 | 10/1981 | Scifres et al. | 331/94.5 S |
| 4,306,765 | 12/1981 | Winzer et al. | 350/96.16 |
| 4,307,932 | 12/1981 | Winzer | 350/96.15 |
| 4,325,605 | 4/1982 | Winzer et al. | 350/96.15 |
| 4,339,290 | 7/1982 | Winzer et al. | 156/159 |
| 4,343,890 | 8/1982 | Phillip et al. | 430/321 |
| 4,376,160 | 3/1983 | Evanchuk | 430/321 |
| 4,422,088 | 12/1983 | Gfeller | 357/19 |
| 4,472,020 | 9/1984 | Evanchuk | 350/96.12 |
| 4,483,582 | 11/1984 | Sheem | 350/96.15 |
| 4,498,731 | 2/1985 | Winzer et al. | 350/96.16 |
| 4,609,252 | 9/1986 | Wong et al. | 350/96.12 |
| 4,708,423 | 11/1987 | Erman et al. | 350/96.15 |
| 4,789,214 | 12/1988 | Vilhelmsson et al. | 350/96.15 |

FOREIGN PATENT DOCUMENTS 2049987 12/1980 United Kingdom .

OTHER PUBLICATIONS

Ash et al., "Interconnection of Optical Fibers to Planar Optical Integrated Circuitry", IBM Tech Discl. Bull., vol 13, No. 9, Feb. 1971, pp. 2529-2530.
Fiber Optics Products News, May/Jun. 1986.

Primary Examiner—Alm E. Ullah
Attorney, Agent, or Firm—Baker, Maxham, Jester & Meador

[57] ABSTRACT

A method of making modular micro-optical systems of great flexibility and adaptability. A substrate is formed with a relief pattern, optical components such as optical fibers are added, another relief pattern is formed, partially through the optical components, and additional components are added, some coupling with the first components. A third relief pattern is formed, further modifying the substrate surface and the optical components already mounted, and further optical components are added, whereby optical signals can be coupled, modulated, transmitted, detected and switched, among others. The method can be employed to form tactile sensors which may be used with robotic manipulators.

24 Claims, 5 Drawing Sheets

MODULAR MICRO-OPTICAL SYSTEMS AND METHOD OF MAKING SUCH SYSTEMS

GOVERNMENT RIGHTS

This invention was made with Government support under Contract No. F19628-88-C-0073 awarded by the United States Air Force. The Government has certain rights in this invention.

FIELD OF THE INVENTION

This invention relates generally to optical information systems and more particularly concerns a flexible, modular, micro-optical system which facilitates creation of custom devices which may be comprised of variable numbers of components having different characteristics and which components may be integrated in different ways for any particular device. This invention provides a flexible approach to the construction and assembly of optical and optoelectronic components and systems.

BACKGROUND OF THE INVENTION

Optical systems have in the past been constructed with discrete optical components such as optical fibers, mirrors, lenses, filters, detectors, lasers, light emitting diodes, wave guides and optical sensors. These components have been extensively used and may be utilized in many types of applications. However, there are instances, particularly with the current emphasis on miniaturization, where discrete components are often too bulky and too difficult to interconnect.

Some of these obstacles have been overcome by the development of integrated optics, where several different optical components are made or mounted directly on a substrate. A large variety of miniature components and systems has been made possible by this approach. A result of this type of miniaturization has in some instances greatly increased manufacturing complexity and reduced flexibility which prevents the circuit designer or engineer from rapidly changing designs.

It has been common to employ three-dimensional structures for interconnecting optical fibers in predetermined fashions. Examples of such three-dimensional structures are found in U.S. Pat. Nos. 4,339,290, 4,498,731 and 4,130,345. In the first of the above three patents, and in U.S. Pat. No. 4,483,582, building blocks are employed in optical systems where the adjacent building blocks are aligned by physical contact with each other and not by a precise interconnection with a master substrate or equivalent framework.

Different means have been devised for holding optical fibers in predetermined locations. Some of these use a polymeric relief pattern such as disclosed in U.S. Pat. Nos. 4,339,290 and 4,164,364. These patterns may be photolithographically created in thick film patterns. These prior art thick film patterns are only used for alignment of optical fibers and have no other functions.

The optical systems of U.S. Pat. Nos. 4,306,765, 4,130,343, and the first three patents mentioned above, disclose semi-reflective or transmissive layers on or in conjunction with optical fiber surfaces. The use of such layers is well known in optical fiber systems. However, one problem with several of the prior art multiple element systems of the types mentioned above is that because the components depend upon accurate surface treatment for proper alignment, errors can be cumulative. In this way, a system so constructed can be very inaccurate in certain aspects of its alignment due to such cumulative errors.

An example of a micro-optical building block system is shown in U.S. Pat. No. 4,789,214. This patent shows the use of predetermined relief patterns which facilitate interconnection or alignment of building block elements. Specifically, it implies a flat master substrate with building blocks having a flat surface with mating relief patterns on them. This structure is somewhat limited in its flexibility because of the fact that at least one of the mating or confronting surfaces have predetermined relief patterns and are flat.

SUMMARY OF THE INVENTION

Broadly speaking, this invention relates to micro-optical systems based on surfaces which may be flat or curved, where the curves are either simple or complex, and where the relief patterns may be created for the specific end use of the optical system while the modular device is being built. It is therefore an improvement over the prior art in that the building blocks need not have flat surfaces and the relief patterns need not be predetermined. Furthermore, in accordance with this invention, the building blocks of these micro-optical systems need not have mating relief patterns. When the relief pattern, according to the invention, is used to align optical fibers, the pattern aligns and supports those fibers on a master substrate. That substrate surface may be flat, cylindrical, spherical, or any other flat or curved surface.

In accordance with the invention, the relief pattern formed on the master substrate can be formed by grooves which are cut, milled, or etched into the substrate or they can be formed by photolithography, or a combination of methods. The relief pattern can be as little as one groove or may include many grooves. Additionally, the relief pattern may be comprised of lands or other features, as well as grooves. At least one optical component such as an optical fiber will normally be mounted in the groove or pattern. The pattern will align the optical component on the surface of the master substrate, both translationally and rotationally. Alternatively to forming the pattern in the substrate surface, a coating may be deposited on or otherwise applied to the surface of the substrate in a way that creates a relief pattern, or a continuous added surface may be selectively etched to form the pattern. The term "optical feature" will be used herein to refer to elements which affect optical signals and are formed in or mounted to the substrate. As an alternative step, when the grooves have been formed and the optical components have been added to the substrate relief pattern, epoxy, glue, solder or other appropriate bonding means may be employed to fix the building blocks and the substrate together.

More specifically, the method starts with forming a relief pattern on a master substrate. One or more optical components, such as optical fibers, are affixed to the substrate using the initial pattern for partial or full alignment of the components. Additional relief pattern elements are formed on the partially completed assembly as needed. This may include either additional relief pattern elements formed on or in the master substrate or on or in the already assembled components, or both. Additional optical or optoelectronic devices or materials are added to the enhanced pattern. These steps of building the modular optical device are repeated as necessary until a complete component or system results.

BRIEF DESCRIPTION OF THE DRAWING

The objects, advantages and features of this invention will be more readily appreciated from the following detailed description, when read in conjunction with the accompanying drawing, in which.

DESCRIPTION OF THE PREFERRED EMBODIMENTS

Figure 1:
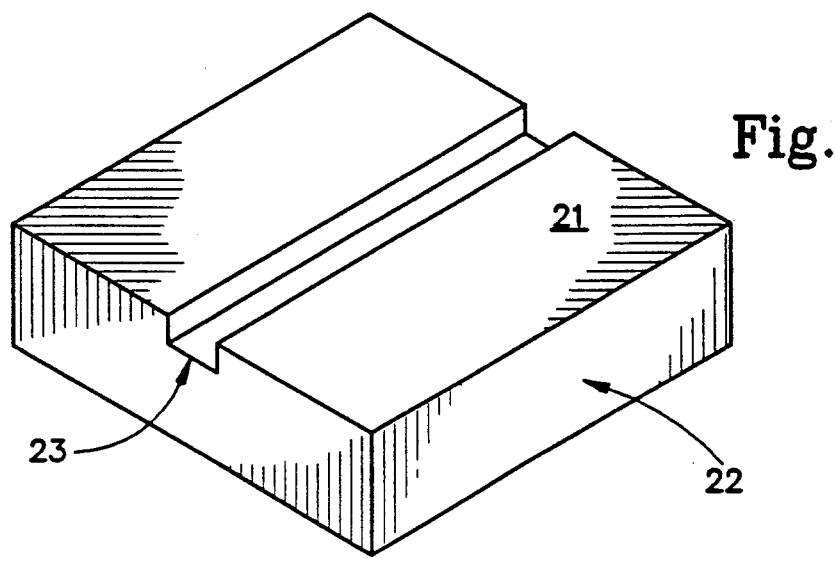
FIG. 1 is a perspective view of a simple substrate showing a groove formed in one surface.

With reference now to the drawing and more particularly to FIGS. 1-5 thereof, the basic method of the invention is described in detail. FIG. 1 shows surface 21 on master substrate 22 having a groove 23 formed therein. This surface and groove combination is an example of what is referred to throughout this description as a "relief pattern".

Examples of materials of which master substrate 22 may be formed include metals, dielectrics and semiconductors. Possible metals which can be used for making building block components include aluminum, stainless steel and brass. Appropriate dielectric materials may be glass, fused silica, ceramic, polymer material, a composite material such as graphite in a polymer host, or plastic. Typical semiconductor materials include silicon and gallium arsenide. Further the optical fibers themselves may be composed of plastic or crystalline material as well as optical glass. More sophisticated materials may also be used and these may be different kinds of optically nonlinear polymers and crystals. Additionally, each building block may be made of one or several different materials. For example, a certain constituent part of one building block of an optical system made in accordance with this invention may be formed of a dielectric while another part of the same building block is made of aluminum. These two parts may be held together either by a permanent joint such as an adhesive, or a joint that enables the part to be separated, such as clips, bolts, screws or mating grooves.

The materials mentioned above are provided by way of example only and are not to be limiting. Any materials which can achieve the basic objectives and provide the characteristics desired for each element may be employed as part of the invention.

Figure 2:
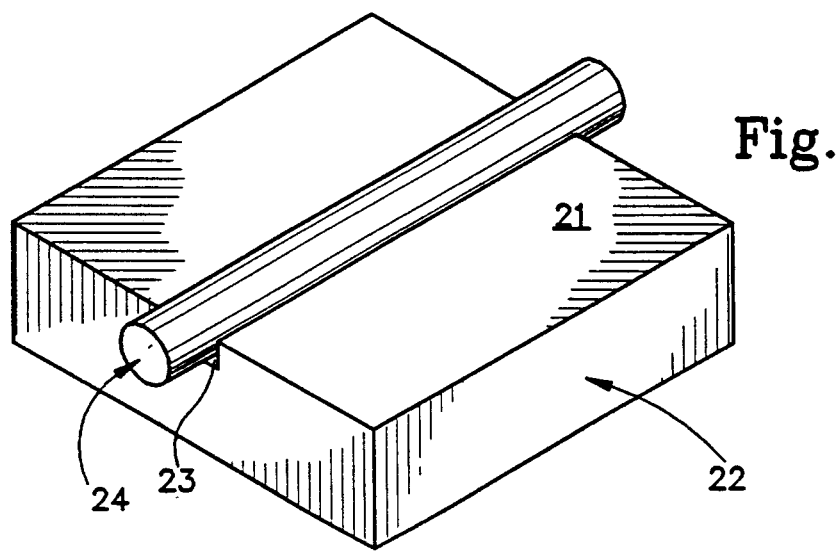
FIG. 2 shows a perspective of the substrate of FIG. 1 with an optical fiber mounted in the groove.
Figure 3:
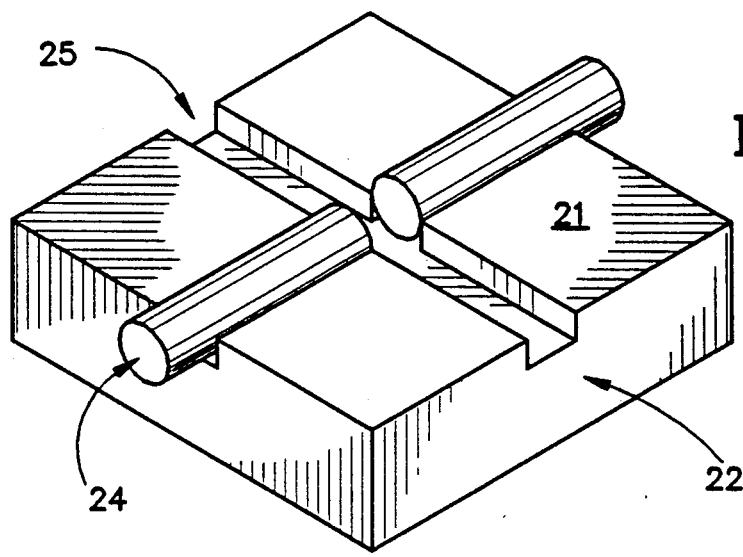
FIG. 3 is a perspective view of the substrate of FIG. 2 showing a second groove.
Figure 4:
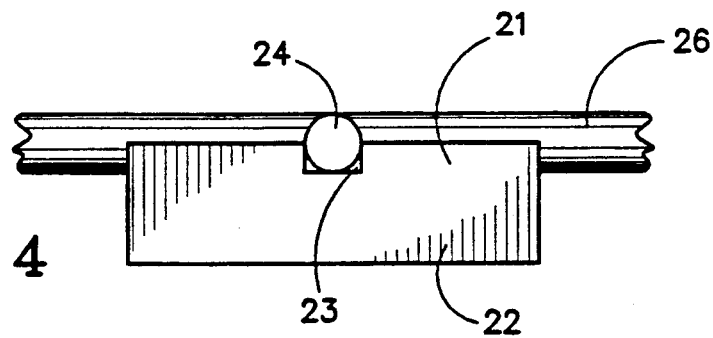
FIG. 4 is an end view of the substrate of FIG. 3 with a second optical fiber mounted in the second groove.
Figure 5:
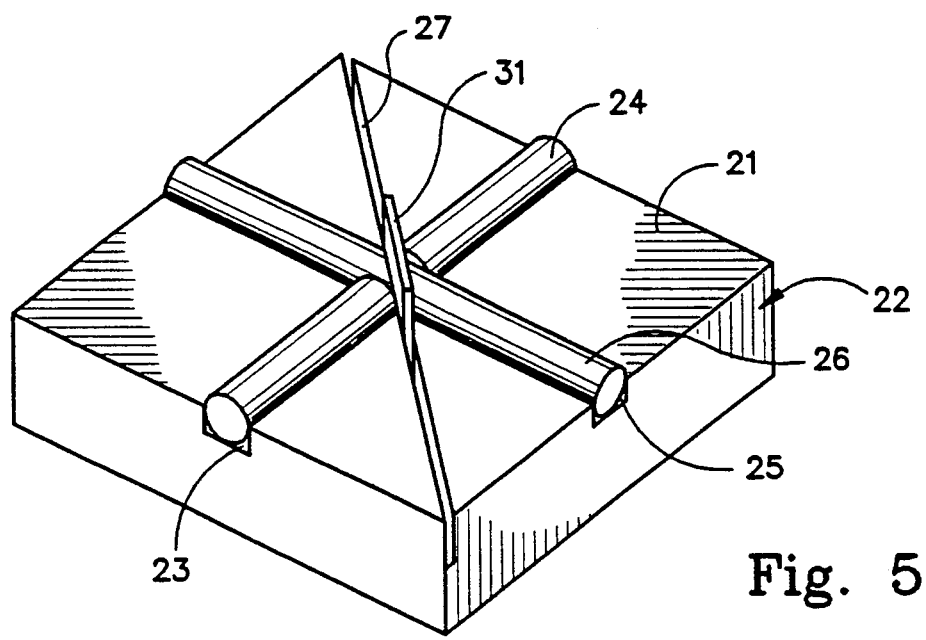
FIG. 5 is a perspective view of the component of FIG. 4 with an added diagonal groove and a reflective optical component added.

The second step in forming a modular micro-optical device is shown in FIG. 2 where the optical feature, optical fiber 24, is mounted in groove 23 of substrate 22. This is a typical optical fiber which is readily available. A common next step for the invention is shown in FIG. 3 where second groove 25 is formed in substrate 22 and through fiber 24. Groove 25 is shown here perpendicular to groove 23 and the already mounted fiber. A second optical fiber 26 is mounted in groove 25 as shown in FIG. 4. Finally, FIG. 5 shows a third groove 27 formed in substrate 22 and on a diagonal through optical fibers 24 and 26. Optical element 31 is mounted at the junction of groove 27 and the already mounted optical fibers to couple a signal from one optical fiber to the perpendicular fiber. This optical feature, coupling element 31, may be either an optically coated or uncoated element. It can function as a filter allowing certain optical frequencies to pass while reflecting others. It may also function as a partial reflector allowing a certain percentage of the optical signal to pass through while reflecting the rest. The amount and frequencies passed or reflected are widely variable. More specifically, this assembly can be used to make fiber optic couplers with varying coupling ratios by changing the reflectively of micro-reflector 31.

Figure 6:
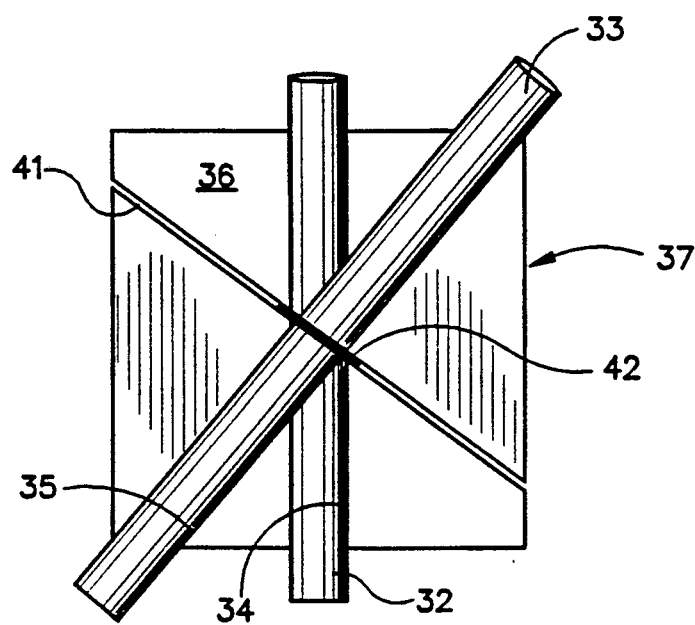
FIG. 6 is a top view of a device which is a modified version of that shown in FIG. 5.

Using the same principles, but where the fibers would not normally be at a 90° angle, this approach, as evidenced in FIGS. 1-5, facilitates fabrication of wavelength division multiplexers. For example, FIG. 6 shows a wavelength division multiplexer with two optical fibers 32 and 33 mounted in respective grooves 34 and 35 on surface 36 of master substrate 37. Another groove 41 is formed at an angle with both of the optical fibers to accommodate a wavelength dependent reflective element 42.

Figure 7:
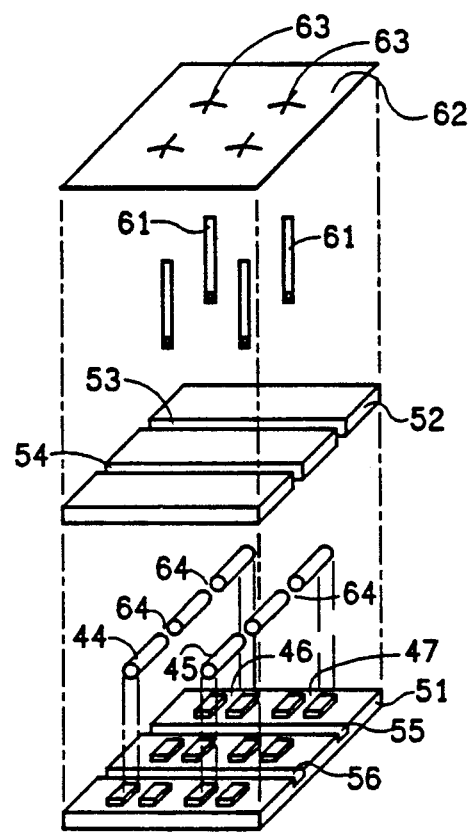
FIG. 7 is a perspective exploded view of a more complex tactile sensor system constructed in accordance with the invention.

In addition to the applications for component fabrication, this method may also be used to construct sensors and sensor systems. An example of such a sensor system is shown in FIG. 7 where the individual optical features and other components are mounted in a master substrate to form a tactile sensor. Optical fibers 44 and 45 are embedded in the relief pattern represented by grooves 46 and 47 in substrate 51. These grooves may be formed photolithographically in an added coating, or they may be cut, etched or otherwise formed in the top surface of the master substrate. A superstrate 52 is placed over the fibers on substrate 51 and cuts 53 and 54 are made through the superstrate and through the fibers thereby forming grooves 55 and 56 in substrate 51 and spaces 64 between aligned segments of fibers 44 and 45. Physical shutter elements 61 are then mounted in superstrate cuts 53 and 54, extending between the segments of the optical fibers into grooves 55 and 56 in the substrate. A flexible skin element 62 is mounted above superstrate 52 to which shutter elements 61 are connected. Skin element 62 may be formed with convex or concave localized areas 63 to which shutter elements 61 are connected. When areas 63 are convex as viewed from the top in FIG. 7, shutter elements 61 normally reside above spaces 64 between the segments of optical fibers 44 and 45. When an area 63 is depressed the shutter element extends between the optical fiber segments to thereby occlude or redirect light signals passing between them. If areas 63 are concave, the shutter elements will normally be in position within spaces 64 in the optical fibers and will be lifted out of those gaps when areas 63 are moved upward, thereby permitting signals to pass between the optical fiber segments. It is possible that the shutter element may either be opaque material or a partially reflecting material, for example.

Figure 8:
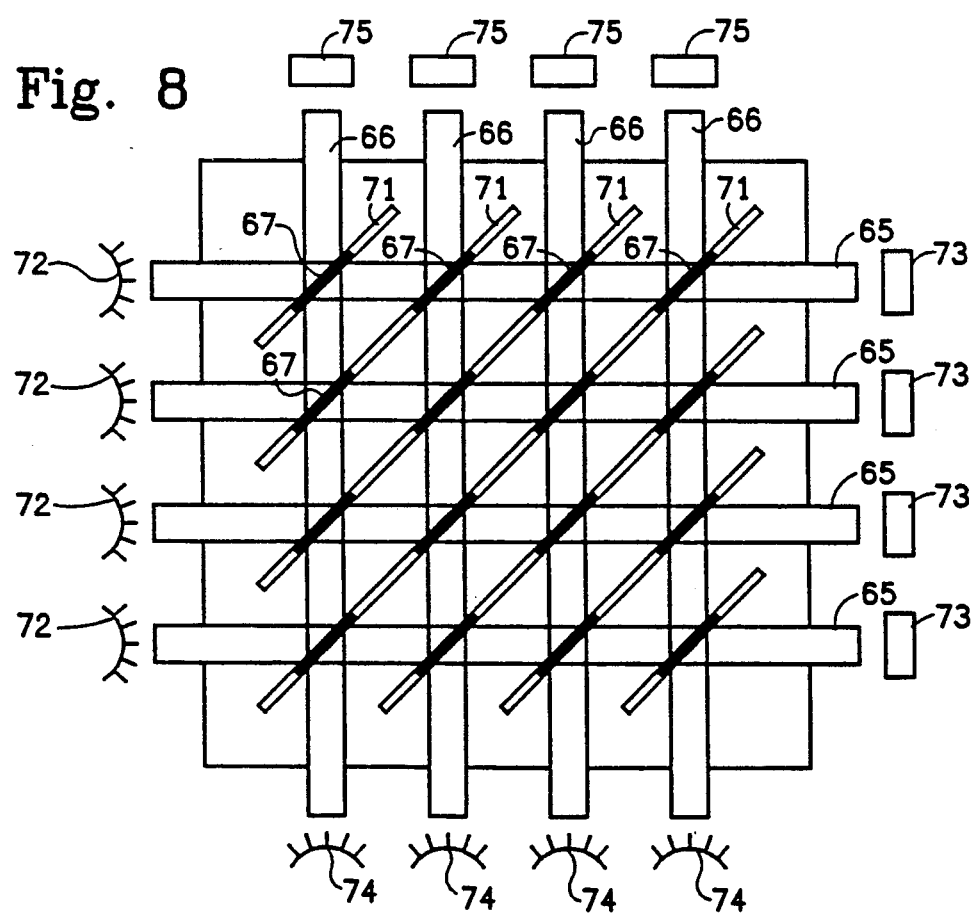
FIG. 8 is a partially schematic plan view of a device similar to FIG. 7 with exemplary input and output devices.

A top view of an optical system which is constructed in a way somewhat similar to that of FIG. 7 is shown in FIG. 8. This is a multiplexer comprised of several elements much like those shown in FIG. 5, with an array of optical fibers 65 arranged horizontally in FIG. 8 with fibers 66 perpendicularly intersecting them. At the intersection of each combination of fibers 65 and 66 is a shutter 67 residing in grooves 71. The shutters may be individually movable or they may be ganged in any combination. Light source elements 72, which may be light emitting diodes or lasers, among others, supply light in any desired modulated or unmodulated form to the ends of fibers 65. At the opposite ends of these fibers are detector elements 73. Similarly, light source elements 74 provide input to fibers 66, with detectors 75 being located at the opposite ends. Note that shutters 67 may be opaque, reflective, or partially reflective and partially transmissive. Detectors 73 and 75 may be any type of optical sensors.

Figure 9:
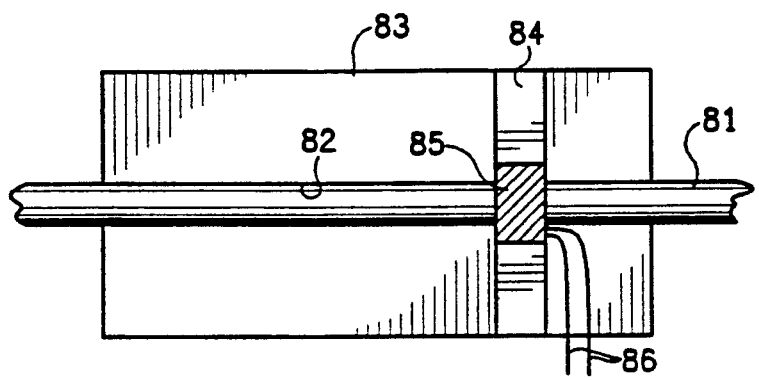
FIG. 9 is a perspective view of an alternative substrate including optical fibers and an optoelectronic device in grooves in the surface of the substrate.

Another embodiment of an optical device made in accordance with this invention is shown in FIG. 9. Optical fiber 81 is mounted in groove 82 in substrate 83. Groove 84 crosses groove 82 and is adapted to receive an active optical device 85 such as a light emitting diode, a laser element, a detector or a modulator. Electrical wires 86 are provided for external connection to device 85.

Figure 10:
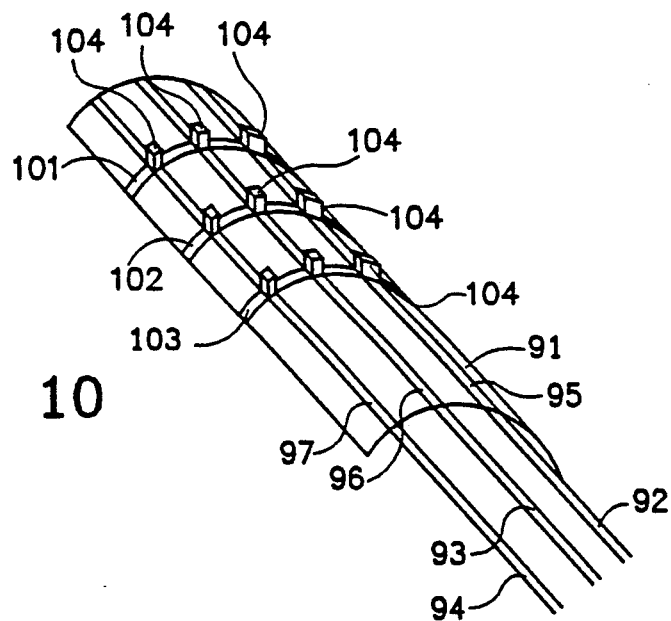
FIG. 10 is a perspective schematic view of a simple curved surface constructed in accordance with the invention.

An example of a curved surface is shown in FIG. 10. This substrate 91 may function as a "finger" for a robotic manipulator. Optical fibers 92, 93 and 94 are mounted in respective grooves 95, 96 and 97 in the substrate. Grooves 101, 102 and 103 are formed on the surface of substrate 91 normal to and cut through optical fibers 92, 93 and 94, to provide locations for modulating elements such as shutters 104. These shutters could operate in a manner similar to those shown in FIG. 7. That is, the modulating elements would be attached to the outer covering or skin of the manipulator of FIG. 9 which functions similar to the skin of the sensor of FIG. 7.

Figure 11:
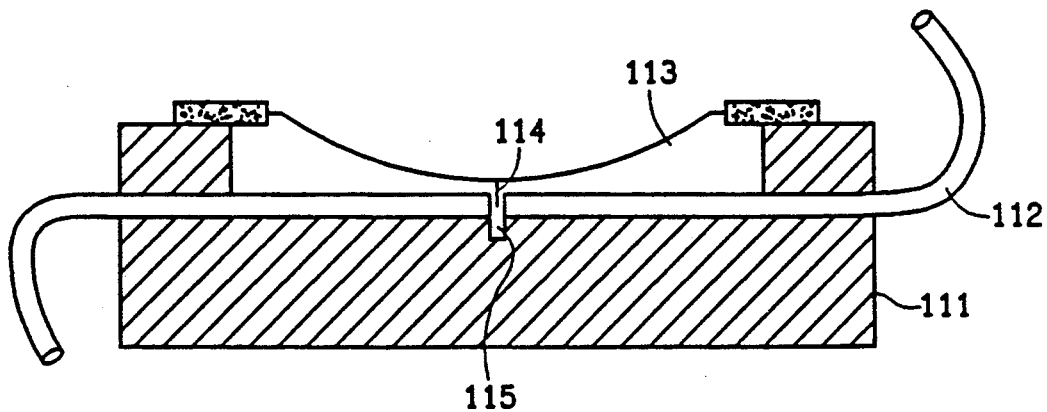
FIG. 11 is a sectional view of a fiber optic microphone constructed in accordance with this invention.

Another alternative embodiment is shown in FIG. 11 where an optical assembly of the type made in accordance with the method of this invention can be used to form a fiber-optic microphone with an optical signal modulated by an acoustically sensitive diaphragm. Substrate 111 is formed with a groove or grooves in which optical fibers 112 are mounted. Acoustic diaphragm 113 is coupled with modulating element 114 which extends into gap 115 cut through the optical fiber. The amount of light which passes through the segments of the optical fiber, or, conversely, the amount of light which is occluded from passing through the optical fiber is directly proportional to the acoustic signal detected by the diaphragm.

In view of the above discussion, it can be appreciated the flexibility of the present invention from the standpoint of the great variety of components which are possible to be made in accordance with this method. Of course, the embodiments shown are merely exemplary and there are many more possibilities. Several advantages result from the novel aspects of the invention. One of them is the self-aligning aspect of the optical components. This directly results from the fact, for example, for segments of optical fibers where alignment is critical, a single fiber is fixed in a groove, thereby being aligned in two translational dimensions as well as two rotational dimensions (pitch and yaw). The segments of the fiber, after it is cut, of course remain aligned. Another advantage is that none of the building blocks need have a predetermined relief pattern. The relief pattern is created as the building blocks are mounted to create an optical system. It is further advantageous that neither the master substrate nor the building block components need be comprised of or even have a flat surface. For example, see FIG. 10 which is an example of a simple curved surface, suggesting how a complex curved surfaced could also be employed in accordance with this invention. A further advantage is that the fabrication and assembly method of this invention can be employed for many different types of components and systems. These components and systems can be or be comprised of active or passive devices including, but not limited to, optical fibers, optical reflectors, fiber-optic couplers including tandem couplers and star couplers, multiplexers, wavelength division multiplexers, demultiplexers, detectors, lasers, light emitting diodes, modulators, waveguides, optical switches, optical sensors and transmitters.

Figure 12:
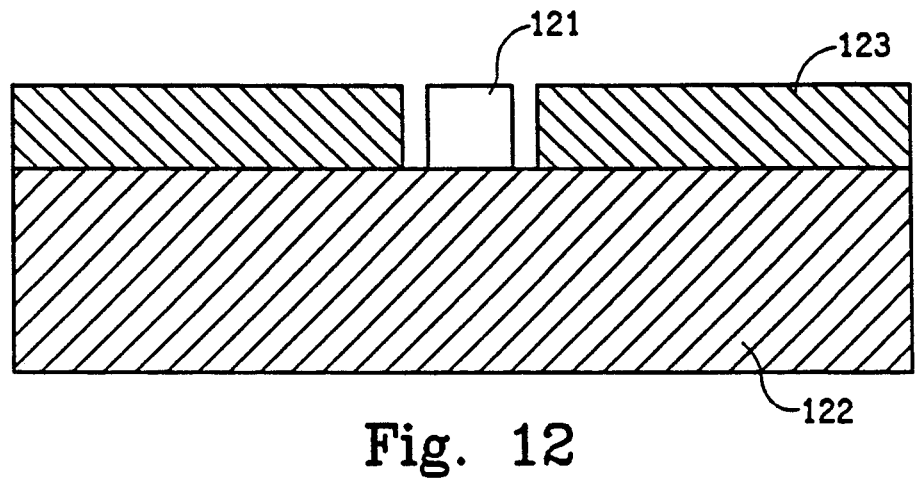
FIG. 12 is a sectional view of an alternative embodiment of a building block with an optical waveguide made in accordance with the invention.

It has been assumed throughout the above description that the relief pattern receives an optical fiber in a precise location in a nested condition. However, there are other ways in which optical features can be formulated and included with a substrate while continuing to use the principles of the invention. FIG. 12 shows an alternative for forming the waveguide by photolithographic means. Optical waveguide 121 transports light from one end to the other as does a discrete optical fiber. This element may be interrupted as shown in FIG. 3. The difference here is that waveguide 121 is formed as a segment of the surface of substrate 122 in such a way that the segment constitutes a waveguide. In this case, a necessary prerequisite is to make at least a portion 123 of substrate 122 from an optically transparent material, such as, for example, a transparent polymeric material. It is also necessary to use a substrate material with a lower refractive index than that of the surface which includes the waveguide. Given these characteristics, waveguide 121 can function the same as a discrete optical fiber which has been the subject of the structures described above.

Figure 13:
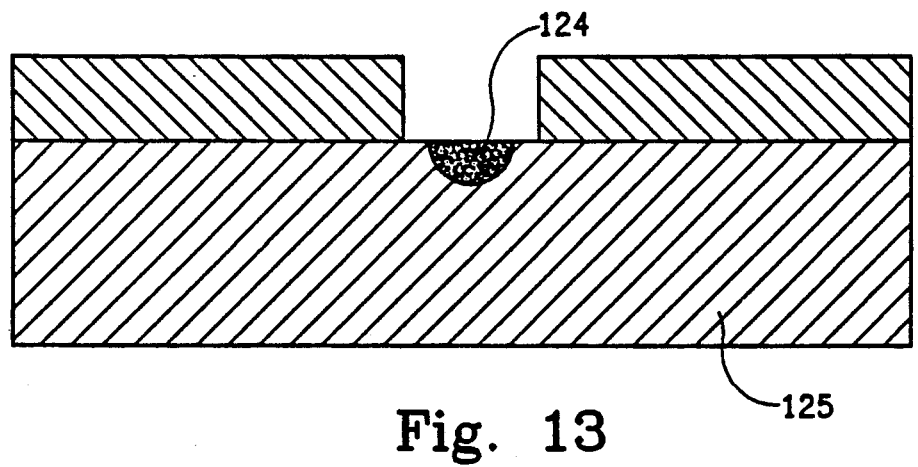
FIG. 13 is a sectional view of another alternative embodiment of a building block with an optical waveguide.

In FIG. 13 another way is shown to accomplish the guiding of light signals between one end and another of a substrate surface. Optical waveguide 124 is positioned on building block substrate 125 to form a waveguide in the surface region of the substrate material itself. This can be accomplished by diffusion, ion implantation or ion exchange of a suitable doping material into the surface of the substrate, thus creating the higher refractive index in the doped material. In this case, it is important to make the building block substrate of an optically transparent material so that the diffused area creates the desired optical waveguide. This waveguide can be modified by being cut as can any of the waveguides or fibers previously discussed.

In view of the above description, it is likely that modifications and improvements will occur to those skilled in the art which are within the scope of the accompanying claims.

What is claimed is:

1. A method of forming a modular micro-optical building block system, said method comprising the steps of:
    forming a master substrate having a working surface;
    forming a first relief pattern on the working surface thereby creating discontinuities thereon;
    mounting first optical component means in the relief pattern to form a partial assembly;
    modifying the partial assembly by forming a second relief pattern in the working surface which includes the optical component means; and
    mounting second optical component means in the second relief pattern.

2. A method of forming a modular micro-optical building block system, said method comprising the steps of:
    forming a master substrate having a working surface;
    forming a first relief pattern on the working surface thereby creating discontinuities therein;
    forming first optical component means in the first relief pattern;
    forming a second relief pattern in the working surface and in the first optical component means; and
    mounting second optical component means in the second relief pattern.

3. A method of forming a modular micro-optical building block system, said method comprising the steps of:
    forming a master substrate having a working surface;
    forming a first relief pattern on the working surface thereby creating discontinuities therein;
    including first optical component means in the first relief pattern;
    forming a second relief pattern in the working surface and in the first optical component means; and
    mounting second optical component means in the second relief pattern.

4. The method recited in claim 1, wherein said first relief pattern forming step comprises forming at least one groove in the working surface.

5. The method recited in claim 4, wherein said first optical component means mounting step comprises mounting at least one optical fiber in at least one of the grooves formed in the first relief pattern.

6. The method recited in claim 5, wherein the second relief pattern forming step comprises forming a groove in the working surface and in at least one of the optical fibers mounted in the first relief pattern.

7. The method recited in claim 6, wherein said second optical component means mounting step comprises mounting at least one optical fiber in at least one of the grooves formed in the second relief pattern.

8. The method recited in claim 6, wherein said second optical component means mounting step comprises placing an optical component in juxtaposition with the first optical fiber in such a way as to couple to or modulate the optical signal in the first component.

9. The method recited in claim 1, and comprising the further steps of:
    modifying the previously formed partial assembly which includes the second relief pattern and the second optical component means by forming a third relief pattern on the working surface thereby creating further discontinuities therein and creating discontinuities in at least some of the first and second optical component means; and
    mounting third optical component means in the third relief pattern.

10. The method recited in claim 7, and comprising the further steps of:
    modifying the previously formed partial assembly which includes the second relief pattern and the second optical component means by forming a third relief pattern on the working surface thereby creating further discontinuities therein and creating discontinuities in at least some of the first and second optical component means; and
    mounting third optical component means in the third relief pattern.

11. The method recited in claim 10, wherein the third optical component means is a micro beamsplitter.

12. The method recited in claim 2, wherein said first relief pattern forming step comprises forming at least one groove in the working surface.

13. The method recited in claim 2, wherein said first optical component forming step comprises forming an optical waveguide in said working surface.

14. The method recited in claim 13, wherein the second relief pattern forming the step comprises forming a groove in the working surface and in at least one of the optical waveguides in the first relief pattern.

15. The method recited in claim 14, wherein said second optical component means mounting step comprises placing an optical component in juxtaposition with the first optical waveguide in such a way as to couple to or modulate the optical signal in the optical waveguide.

16. The method recited in claim 2, and comprising the further steps of:
    forming a third relief pattern on the working surface thereby creating further discontinuities therein and creating discontinuities in at least some of the first and second optical component means; and
    mounting third optical component means in the third relief pattern.

17. The method recited in claim 3, wherein said first relief pattern forming step comprises forming at least one groove in the working surface.

18. A method of forming a modular micro-optical building block system, said method comprising the steps of:
    forming a master substrate having at least one optical feature formed therein;
    forming a first relief pattern in the master substrate thereby modifying at least one of the optical features in the master substrate; and
    mounting first optical component means in the relief pattern so that the first optical component means is in juxtaposition with at least one of the modified optical features of the substrate.

19. The method recited in claim 18, wherein the optical feature is an optical waveguide.

20. The method recited in claim 19, wherein the first optical component means is a photodetector.

21. The method recited in claim 19, wherein the first optical component means is a light source.

22. The method recited in claim 19, wherein the first optical component means is an optical signal occluding element.

23. A method of forming a modular micro-optical building block system, said method comprising the steps of:

forming a master substrate having a working surface;
forming a first relief pattern on the working surface thereby creating discontinuities therein;
mounting first optical component means in the first relief pattern;
forming a second relief pattern in the working surface and in the first optical component means; and
forming second optical component means in the second relief pattern.

24. A method of forming a modular micro-optical building block system, said method comprising the steps of:
forming a master substrate having a working surface;
forming a first relief pattern on the working surface thereby creating discontinuities therein;
mounting first optical component means in the first relief pattern;
forming a second relief pattern in the working surface and in the first optical component means; and
including second optical component means in the second relief pattern.

* * * * *